United States Patent [19]
Lum et al.

[11] Patent Number: 5,764,238
[45] Date of Patent: Jun. 9, 1998

[54] METHOD AND APPARATUS FOR SCALING AND BLENDING AN IMAGE TO BE DISPLAYED

[75] Inventors: Sanford S. Lum; Dwayne R. Bennett, both of Scarborough, Canada

[73] Assignee: ATI Technologies Inc., Thornhill, Canada

[21] Appl. No.: 118,896

[22] Filed: Sep. 10, 1993

[51] Int. Cl.$^6$ .................................................... G06T 3/00
[52] U.S. Cl. ............................................................ 345/439
[58] Field of Search ............................... 395/133, 139, 395/128, 129, 141, 142, 143; 382/41, 44–47, 52; 345/136–138

[56] References Cited

U.S. PATENT DOCUMENTS

| | | | |
|---|---|---|---|
| 4,653,013 | 3/1987 | Collins et al. | 395/139 |
| 4,672,680 | 6/1987 | Middleton | 395/139 X |
| 4,875,173 | 10/1989 | Nakajima | 395/139 X |
| 5,491,769 | 2/1996 | Moller | 395/139 |

Primary Examiner—Almis R. Jankus
Attorney, Agent, or Firm—Pascal & Associates

[57] ABSTRACT

The present invention relates to an image scaler comprised of apparatus for receiving coefficients a and b and image display values of adjacent pixels P and Q respective of an image, apparatus for repeatedly operating on the coefficients and values for successive pixels according to the transform $$A_{cc} = \frac{aP + bQ}{SUM} + R$$

where

SUM is the sum of the coefficients,

R is either zero or the accumulated SUM of an immediately preceding operation, $A_{cc}$ is an accumulated result signal, and apparatus for providing a first result signal as an output coefficient word for controlling the display of each of adjacent pixels.

19 Claims, 4 Drawing Sheets

METHOD AND APPARATUS FOR SCALING AND BLENDING AN IMAGE TO BE DISPLAYED

FIELD OF THE INVENTION

This invention relates to computer graphics and in particular to a two-dimensional image scaler that can be used to scale live video images, graphic images or still images and in particular one in which the image in each of X and Y directions may be scaled up or down independently with colour blending to preserve colour levels.

BACKGROUND TO THE INVENTION

Computer multi-media signal processing usually combines graphics and video images. It is desirable to be able to manipulate the images, i.e. to scale (vary) the size of the images in the X or Y direction independently. Pixel blending is required to preserve colour and brightness of pixels when stretching, and many pixels must be averaged to a few to minimize information loss in a size reduction.

Graphical stretches and reductions previously tended to be software implementations, and were applications specific. However these are unsuitable for stretching or reducing live video images, due to the intensity of use of the computer CPU, creating a large overhead. In order to minimize CPU overhead, hardware scalers were produced. However these were typically used in a digital to analog converter which translate the output of the graphics or display circuit immediately previous to the display. These scalers have only been able to scale upwards to multiples of the image source size. Further, since the output of the scaler is an analog signal suitable for the display, the image signals could only be displayed, and could not be read back digitally or operated on again.

SUMMARY OF THE PRESENT INVENTION

The present invention is a scaler preferable implemented in hardware (and preferably in an integrated circuit chip), which is independent of source or destination of the data signal, and uses coefficients which are preferably stored in screen memory or cached on the scaler chip. The invention provides the ability to do independent scaling in the X and Y directions, scaling to non-integral sizes, pixel blending to preserve colour and brightness of pixels when stretching, and averaging many pixels to a few pixels to minimize information loss during a reduction. A stretch or reduce process can be arbitrarily designated, which is tailored for a particular image or application. Since it is implemented in hardware, the invention operates at high speed, and therefore is suitable for live video (e.g. 30 frames per second) images.

In accordance with an embodiment of the invention, an image scaler is comprised of apparatus for receiving coefficients a and b and image display values of adjacent pixels P and Q respective of an image, apparatus for repeatedly operating on the coefficients and values for successive pixels according to the transform $$A_{cc} = \frac{aP + bQ}{SUM} + R$$

where

SUM is the SUM of the coefficients,

R is either zero or the accumulated SUM i.e., Acc of an immediately preceding operation, $A_{cc}$ is an accumulated result signal, apparatus for providing the result signal as an output coefficient word for controlling the display of each of adjacent pixels.

In accordance with another embodiment of the invention, an image scaler is comprised of a vertical blend ALU for performing the transform $$\frac{a_v P + b_v Q}{SUM_v} + R$$

a horizontal blend ALU for performing the transform $$\frac{a_H P + b_H Q}{SUM_H} + R$$

where $a_v$, $b_v$, $a_H$ and $b_H$ are vertical and horizontal blending coefficients, P and Q are respectively parameters relating to adjacent pixels, $SUM_v$ and $SUM_H$ are respectively sums of the vertical and horizontal coefficients, and R is either zero or the accumulated result of a previous operation, apparatus for providing P and Q data of pairs of adjacent image lines to the vertical blend ALU, apparatus for receiving and buffering the output of the vertical blend ALU for providing R data to the vertical blend ALU, and for providing P and Q data to the horizontal blend ALU, a pixel accumulator connected to the output of the horizontal blend ALU for providing R data to the horizontal blend ALU and for providing an output signal comprising pixel data resulting from expansion, contraction or unity transformation of the P and Q data.

In accordance with another embodiment of the invention, a method of scaling images is comprised of receiving coefficients a and b and image display values of adjacent pixels P and Q respective of an image, repeatedly operating on the coefficients and values for successive pixels according to the transform $$A_{cc} = \frac{aP + bQ}{SUM} + R$$

where

SUM is the SUM of the coefficients,

R is either zero or the accumulated SUM of an immediately preceding operation, $A_{cc}$ is the accumulated result signal, (c) providing the result as an output coefficient word for controlling the display of each of adjacent pixels.

In accordance with another embodiment of the invention, a method of scaling images is comprised of performing the transform in a vertical blend ALU $$\frac{a_v P + b_v Q}{SUM_v} + R$$

performing the transform in a horizontal blend ALU $$\frac{a_H P + b_H Q}{SUM_H} + R$$

where $a_v$, $b_v$, $a_H$ and $b_H$ are vertical and horizontal blending coefficients, P and Q are respectively parameters relating to adjacent pixels, $SUM_v$ and $SUM_H$ are respectively sums of the vertical and horizontal coefficients, and R is either zero or the accumulated result of a previous operation, providing P and Q data of pairs of adjacent image lines to the vertical blend ALU, providing R to the vertical blend ALU, for providing P and Q data to the horizontal blend ALU, a pixel accumulator connected to the output of the horizontal blend ALU for providing R to the horizontal blend ALU and for providing an output signal comprising pixel data resulting from expansion, contraction or unity transformation of P and Q.

BRIEF INTRODUCTION TO THE DRAWINGS

A better understanding of the invention will be obtained by reference to the detailed description below, in conjunction with the following drawings, in which.

DETAILED DESCRIPTION OF THE INVENTION

The present invention can be applied to any of the three cases of stretching an image, reducing an image, and maintaining the size of an image. Stretching requires that there are more destination pixels than source pixels and reducing requires that there are more source pixels than destination pixels. In the third case, there are an equal number of source and destination pixels. The present invention may be applied to any of the three cases independently of all others, or may be combined.

In the present invention, the pixel energy of a source is divided equally over a destination region, and then is normalized so that brightness per pixel is preserved. This may be done by oversampling.

Assume that there are n pixels along one trajectory and m pixels along the other trajectory. Since the operation is reversible, source and destination are arbitrary. Both trajectories are subdivided into n×m sub-pixels, then they are aligned to the same size.

Figure 1:
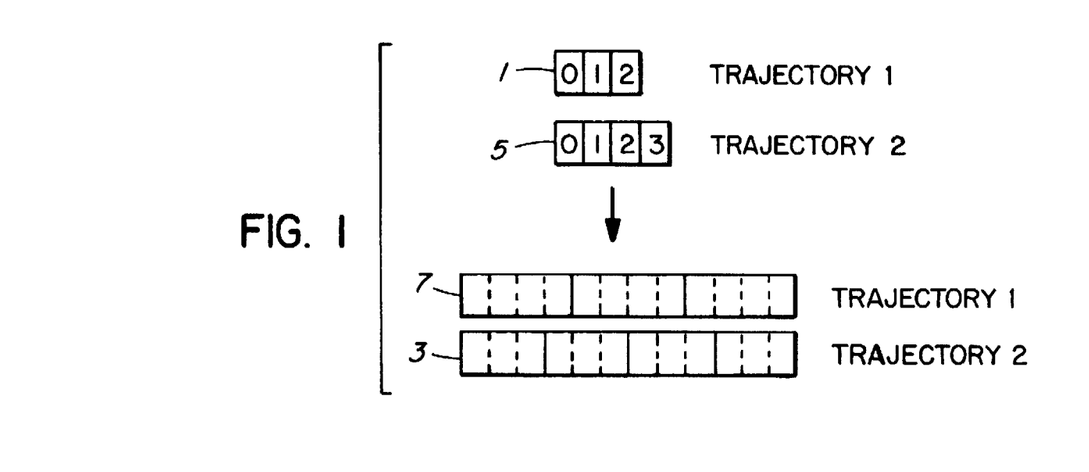
FIG. 1 illustrates an example of pixels undergoing expansion or contraction.

As an example, consider the case of n=3 and m=4, as shown in FIG. 1.

In a first case, the three pixels in trajectory 1 are being expanded to trajectory 2. The three pixels of trajectory 1 are multiplied by four, making twelve pixels, which are divided into the four pixel regions 3 of trajectory 2.

Similarly, the four pixels 5 of trajectory 2, multiplied by three are divided into the three pixel regions 7 of trajectory 1.

Figure 2:
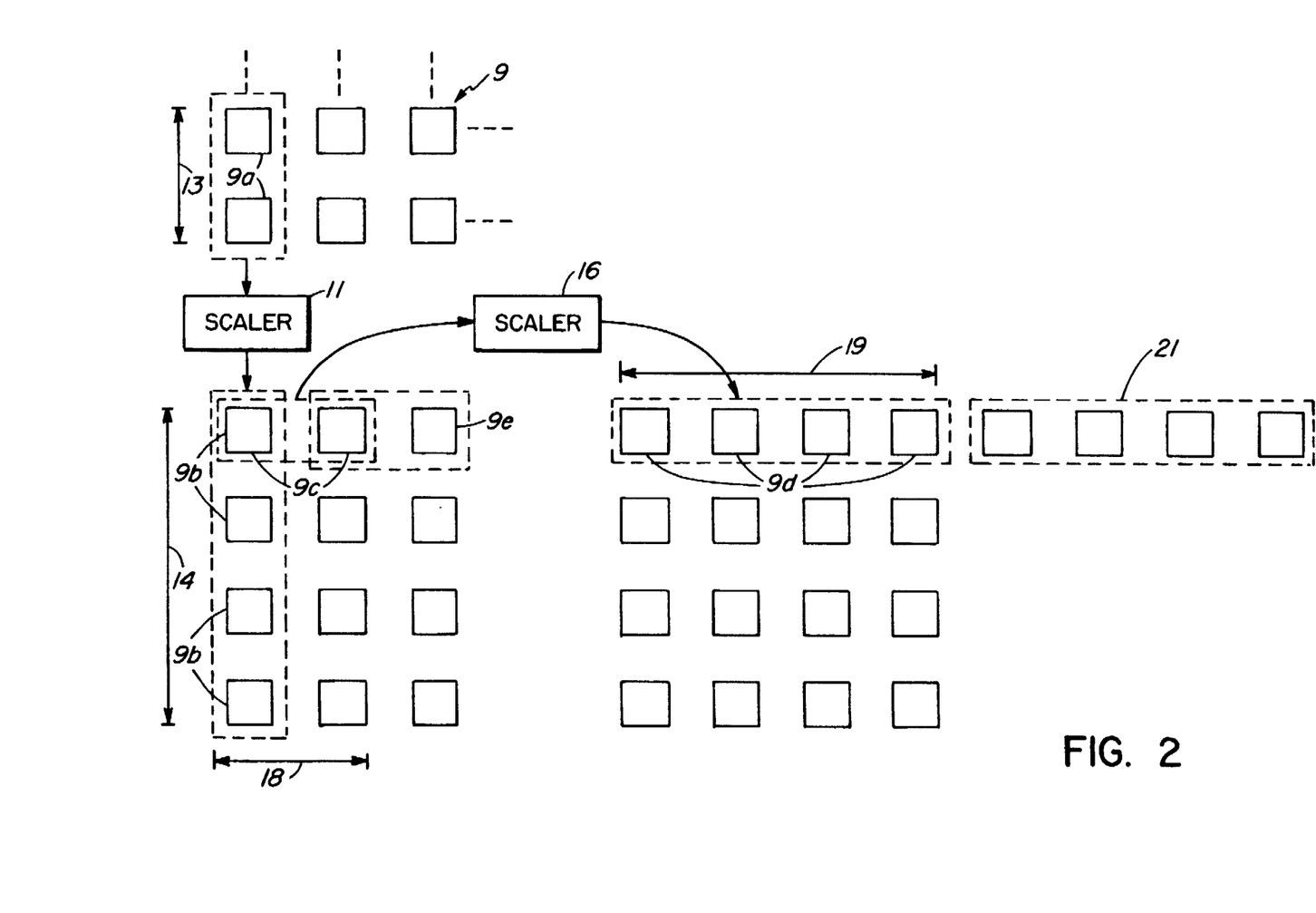
FIG. 2 illustrates pixels undergoing an expansion process.

This is illustrated in another way in FIG. 2. Consider an array of six pixels 9 which are to be displayed. These pixels may be representations thereof stored as pixel attributes (intensity, hue, saturation) in a screen memory of a graphics display circuit.

In order to stretch the image, the data of two adjacent pixels 9a in two adjacent lines are passed through a scaler 11, and result in four pixels 9b. The total width of the two pixels 9a thus has been increased in size from the width shown by arrow 13 to the width shown by arrow 14.

It may now be seen that rather than two lines of pixels, there are four lines of pixels. The pixel data of two horizontally adjacent pixels 9c are applied through scaler 16 and the result is pixel data for the four pixels 9d, which has been expanded from the width indicated by arrow 18 to the width shown by arrow 19.

Once this has been done, the data relating to next adjacent horizontal pixel 9e and the immediately adjacent pixel of the pair 9c are passed through scaler 16, resulting in expansion to the four pixels 21.

While the example shown in FIG. 2 described expansion of two pixels to four, it may be seen that the scaler can multiply or divide the two adjacent horizontal or vertical pixels by any value. Indeed, the value can be dynamically changed, can include translation via an algorithm to wrap the pixels around another image, and can be used to vary the expansion or contraction of the image to any desirable extent, e.g. to obtain warping for special effects, warping to a contour of an object, etc., on the fly, at live video rates.

It should be noted that vertical scaling using scaler 11, or horizontal scaling using scaler 16 may be used independently, or each may be used in sequence. Embodiments of both cases will be described in more detail below. For the purpose of simplicity, a stretching with blending function will be described; special effects such as variation of the stretching or reduction amount by apparatus performing an algorithm will then become obvious to a person skilled in the art understanding the present invention.

It is assumed that a person skilled in the art is familiar with computer graphics systems design, such as described in the text "Fundamentals of Interactive Computer Graphics" by J. D. Foley and A. Van Damm, Eddison-Wesley Publishing Company of Menlow Park, Calif. and Don Mills, Ontario, copyright 1982.

Figure 3:
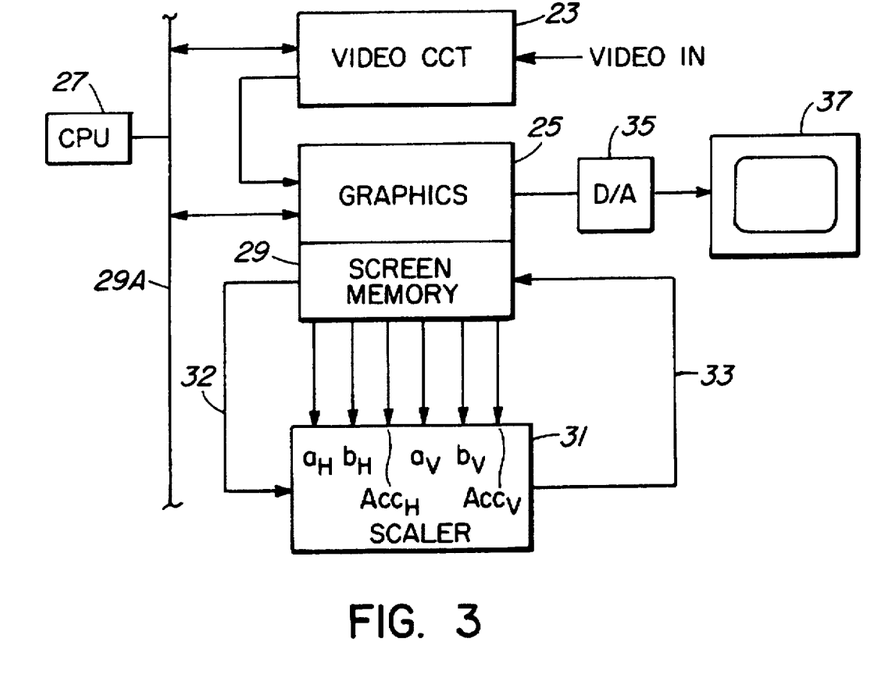
FIG. 3 is a block diagram of a system which includes the present invention.

While the invention is not limited to the system shown in FIG. 3, this figure illustrates part of a computer architecture which may contain the present invention. A video circuit 23 receives a video signal, digitizes it, and applies it to a graphics circuit 25. The video circuit and graphics circuit are controlled by central processing unit (CPU) 27 via bus 29. In addition to control signals, the graphics circuit 25 also receives from the CPU graphics signals and coefficients needed for stretching or reducing the digitized video signal, as well as graphics display signals, etc.

The graphics circuit 25 includes a screen memory 29, which stores the coefficients and data relating to each pixel, e.g. intensity, hue and saturation. It also stores the destination data signal from the present invention. Accumulation is done in the line buffers.

In accordance with the present invention, a scaler circuit 31 receives source signals via source bus 32 from the graphics circuit screen memory. The data carried thereon is the pixel data referred to above. A destination bus 33 carries an output signal from the scaler to the screen memory 29, which data is used for display. The resulting data is processed by graphics circuit 25, the processed data is converted from digital to analog form in D/A converter 35, and is applied to video monitor 37 for display.

It may be seen that since the source and destination data is digital, and is received from and is applied to graphics circuit 25, the data can be further manipulated prior to display. Further, the pixel data and the coefficients can be varied by an algorithm processed by graphics circuit 25, or by CPU 27, or by other circuits associated with the system. Suffice to say that any of the parameters, and particularly the coefficients, can be programmed by the application program, including by manual variation (e.g. mouse control, etc.). This provides maximum flexibility in stretching, reduction, warping, etc. of the live video or other image which is processed.

The scaler 31 contains either or both of scalers 11 and 16 referred to above and shown in FIG. 2. Each scaler circuit 31 contains apparatus to perform a transformation of source (S) to destination (D) trajectories, as described above with the aid of FIGS. 1 and 2. First, a theoretical and then a practical explanation of the transformation of the pixel group expansion described above with respect to FIG. 1 will be given.

If trajectory 1 is the source and trajectory 2 is the destination, general equations for the transformation which may be observed from FIG. 1 are:

$$D_0 = \frac{3}{4} S_0$$
$$D_1 = \frac{1}{4} S_0 + \frac{1}{2} S_1$$
$$D_2 = \frac{1}{2} S_1 + \frac{1}{4} S_2$$
$$D_3 = \frac{3}{4} S_2$$

and normalizing $$D_0 = S_0$$
$$D_1 = \frac{1}{3} S_0 + \frac{2}{3} S_1$$
$$D_2 = \frac{2}{3} S_1 + \frac{1}{3} S_2$$
$$D_3 = S_2$$

For the reverse transformation, i.e. the source is trajectory 2 and the destination is trajectory 1, the normalized equations are:

$$D_0 = \frac{3}{4} S_0 + \frac{1}{4} S_1$$
$$D_1 = \frac{1}{2} S_1 + \frac{1}{2} S_2$$
$$D_2 = \frac{1}{4} S_2 + \frac{3}{4} S_3$$

Of course the unity case is trivial.

From the equations derived above, the present invention provides a hardware pixel blender that implements the generalized equation:

$$D = \frac{aP + bQ}{a + b}$$

where a and b are blending coefficients and P and Q are the parameters describing adjacent pixels. It should be noted that this applies to each pixel component. This will handle all cases except for the case of the source being twice as large or bigger than twice as large as the destination. In the latter case the general equation is:

$$D = \frac{aP + bQ + cS + \ldots}{a + b + c \ldots}$$

It is preferred that rather than building a pixel ALU for an arbitrary number of operands, a multicycle ALU is used to operate this transform:

$$\text{Accumulator} = \frac{aP + bQ}{\text{coefficient\_sum}} + R$$

where R is either zero or the accumulated result of the previous operation, and a and b are any two consecutive coefficients within a list of coefficients needed. The sum of all coefficients is preferred to be known and fixed. The running total of the equation is kept in an accumulator until the equation has been completed when the result is written to the destination. In the preferred embodiment to be described below, the coefficient sum is fixed at 16, but this could be whatever the designer finds convenience to implement the design.

Coefficients a and b for both the horizontal and vertical (X) and (Y) directions is provided from screen memory 29 to the scaler 31 (FIG. 3). It is preferred that this data is provided in a coefficient word of the form shown in FIG. 4, although this specific form need not be used.

Figure 4:
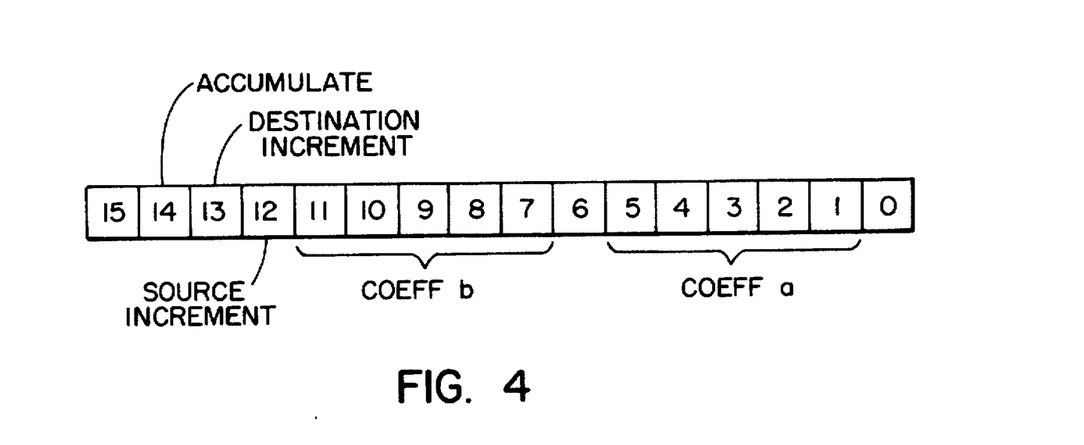
FIG. 4 is a diagram of the form of a word containing coefficients which is preferred to be used in the present invention.

For this embodiment, the sum of all coefficients is, as noted above, fixed at 16 and both coefficients a and b occupy the range 0–16. This range was chosen because it is relatively easy to implement in a 4×8 multiplier and because a stretch or reduction of greater than 16:1 is very unlikely for a typical computer application. The coefficients a and b are programmable and contain additional information for complete processing of every pixel. The order of the information fields in the coefficient word shown in FIG. 4 is arbitrary. Five bits are allocated to each coefficient, shown as 1–5 for coefficient a and 7–11 as coefficient b (they range from 0–16 and not 0–15). Additional bits are reserved for future expansion of the coefficient ranges. The source and destination increment bits shown as bits 12 and 13 respectively determine whether the source and destination trajectories respectively are post-incremented. The accumulate bit shown as bit 14 determines whether R is 0 or the value of the pixel accumulator. In the ideal case, the number of coefficients needed for a stretch or reduce operation is equal to the larger of source and destination lengths. Leaving the coefficients programmable by the application program in this manner offers maximum flexibility in choosing stretching and reducing algorithms. While the coefficients have been shown in FIG. 3 as being stored in screen memory, they may be cached on the scaler 31 chip.

Figure 5:
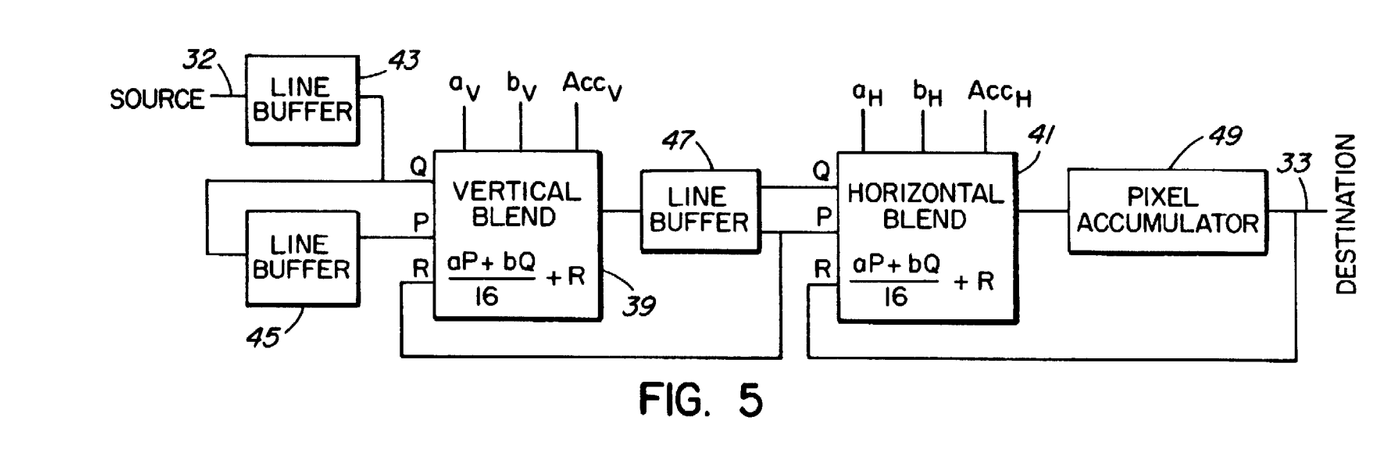
FIG. 5 is a block diagram of one embodiment of the present invention.

FIG. 5 illustrates a block diagram of one embodiment of the scaler. The structure is comprised of an ALU 39 for performing a vertical blend function and an ALU 41 for performing a horizontal blend function. ALU 39 receives the vertical blending coefficients $a_v$ and $b_v$ and the vertical accumulate $A_{ccv}$ data resulting from the operation of ALU 39. This data is received, in the embodiment shown in FIG. 3, from screen memory 29 of graphics circuit 25.

Similarly, the ALU 41 receives from screen memory 31 the horizontal blend coefficients $a_H$ and $b_H$ and the accumulate $A_{ccH}$ resulting from operation of accumulator 41.

ALU 39 receives adjacent pixel data relating to the first or input trajectory on input ports Q and P, the data for the Q port being received via line buffer 43 from the data source, which can be screen memory 29, via source bus 32. The output of line buffer 43 is connected to the input of line buffer 45, the output of which is connected to the P port of ALU 39.

The output of ALU 39 is applied to the input of line buffer 47. The Q pixel data is applied to the Q input port of ALU 41 and the P pixel data is applied to the P input port of ALU 41. That data is also applied to the R input of ALU 39.

The output of ALU 41 is connected to the input of pixel accumulator 49, which provides an output signal on bus 33 for application to a destination which, in the embodiment described, is screen memory 29 of graphics circuit 25. That output data is also applied to the R input of ALU 41.

The line buffers are ideally the maximum source line size in length. Line buffer 47 is used as a line accumulator in a similar fashion as the pixel accumulator. The accumulator values $A_{ccV}$ and $A_{ccH}$ applied to ALU 39 and ALU 41 respectively determine whether R should be forced to zero or should equal the value in the accumulator.

In operation, a first line of data from a source trajectory is read into line buffer 43. The data of line buffer 43 is transferred to line buffer 45, while a second line of data is transferred from the source trajectory to the line buffer 43. Thus it may be seen that the data at the P and Q ports of ALU 39 represent pixels of two successive vertical lines.

The ALU 39 vertically blends and stores the result in line buffer 47. The data is transformed in ALU 39 according to the equation $$\frac{a_V P + b_V Q}{16} + R$$

The pixel data from line buffer 43 is then transferred into line buffer 45. The source trajectory is read and transferred to line buffer 43, in the same manner as described above. Thus it may be seen that the second line becomes the first line and the new line becomes the second line of two vertical lines to be blended by ALU 39. The process of vertical blending in accordance with the aforenoted transformation is then repeated by ALU 39. This step is continuously repeated into the next frame until the data relating to at least two horizontally adjacent pixels are stored in line buffer 47.

For the rest of each horizontal line the data relating to two consecutive horizontal pixels are applied on input lines Q and P to ALU 41 and are blended in accordance with the equation $$\frac{a_H P + b_H Q}{16} + R$$

The result of this equation is output from ALU 41 and is stored in pixel accumulator 49.

For each pair of adjacent pixels in each line, there is a vertical blend function and storage thereof in line buffer 47. The pixel data is transferred from line buffer 43 into line buffer 45. The source trajectory is read and transferred to line buffer 43. The steps described above for the vertical blending function is repeated for the rest of the image.

It should be noted that the source trajectory should only increment with a source increment that is set in a coefficient list in the screen memory 29 or equivalent. If the source is incremented in the X direction and not in the Y direction and the end of the source line is reached, the source pointer is preferred to be reset to the beginning of the current line. If the source is incrementing in both directions and the end of the source line is reached, it is preferred that the source pointer should be set to the beginning of the next line.

The destination trajectory should be incremented in a similar fashion as the source trajectory except that the destination increment bits of the coefficient list should be used.

Line buffer pointers should be incremented when the source increment bit is set in the X direction. They should be reset to zero when the end of the source line is reached. Data should not be written to line buffer 43 nor transferred to line buffer 45 if the source increment bit is not set in the Y direction. Destination data should only be written out from the pixel accumulator if both X and Y destination increments bits are set.

The X coefficient pointer in screen memory 29 should be incremented for each pixel operation, and the Y coefficient pointer should be incremented for each line operation.

Figures 6, 7:
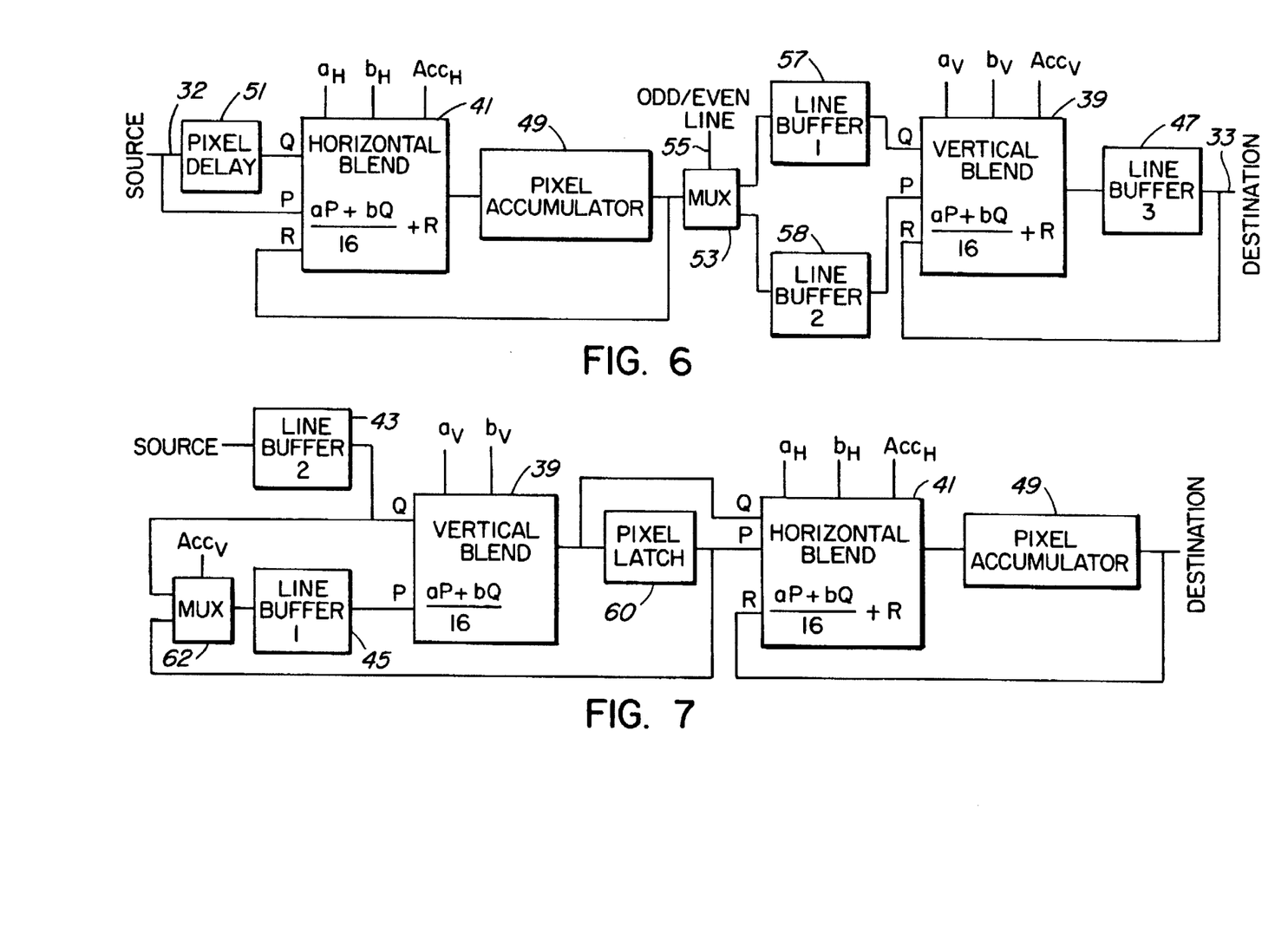
FIG. 6 is a block diagram of another embodiment of the present invention.
FIG. 7 is a block diagram of another embodiment of the present invention.

The design described above which performs the vertical pixel blending prior to the horizontal pixel blending is arbitrary, and may be reversed. FIG. 6 illustrates a block diagram in which horizontal blending is performed prior to vertical blending. It should be noted that blending in only one direction can be implemented, whereby one of the ALUs is provided with coefficients which provide unitary transformation, i.e. neither expansion nor contraction of the image.

In the embodiment of FIG. 6, ALU 41 receives horizontal pixel data from the source bus 32 at its input port P and also via a one pixel delay element 51 (which can be a buffer) at input port Q and the coefficients etc. from the screen memory as described above. The output of ALU 41 is applied to a pixel accumulator 49, the output of which is applied to the R input port of ALU 41. The horizontal blend function operates as described above with respect to the embodiment of FIG. 5.

The output of pixel accumulator 49 is applied to multiplexer 53, which has an input 55 from graphics circuit 25 that indicates to the multiplexer whether the pixel at the input of multiplexer 53 relates to an odd or an even line. The even line pixel data is applied from the multiplexer to one of line buffers 57 and 58, and the odd line pixel data is applied to the other of line buffers 57 and 58. The outputs of line buffers 57 and 58 are applied to the Q and P ports of ALU 39, which receives its coefficients, etc. as described above, and outputs its data to line buffer 47, and operates in a manner described above with respect to FIG. 5. Depending on the operation of multiplexer 53, a pixel delay element may be connected in series with the P input of ALU 39 in order to align the vertical pixels of successive lines.

The output of line buffer 47 is carried on destination bus 33 to the screen memory 29 for processing by graphics circuit 25 and subsequent provision of the display signals for display on monitor 37.

FIG. 7 illustrates another embodiment, in which vertical blend is performed first, followed by horizontal blend, but in which line buffer 47 has been eliminated. In a successful embodiment of the design shown in FIG. 7, each line buffer was limited to a length of only 32 pixels.

The design of FIG. 7 is similar to that of FIG. 5 except that instead of line buffer 47, the output of the vertical blend ALU 39 is applied directly to the Q port of the horizontal blend ALU 41, and the output of vertical blend ALU 39 is also applied through a pixel latch 60 to the P port of ALU 41. Instead of the output of line buffer 43 being connected directly to the input of line buffer 45, it is connected to the input of a multiplexer 62; the output of pixel latch 60 is connected to another input of multiplexer 62, rather than to the R input of ALU input 39. The $A_{cc}$, input, rather than being applied to ALU 39 is connected to the control input of multiplexer 62. The output of multiplexer 62 is connected to the input of line buffer 45.

With the above-noted changes, the vertical blend ALU 39 can only accumulate into the line buffer 45. The blend equation becomes $$\frac{a_V P + b_V Q}{16} \rightarrow P$$

wherein the result of the equation is assigned back to P if a vertical accumulate is desired. Coefficient generation in the vertical direction should also be modified accordingly. Line buffer 45 is otherwise loaded in a similar fashion as in the ideal case, i.e. line buffer 43 data is transferred to it only when the source Y increment bit is set.

Smaller line buffer sizes, i.e. only 32 pixels strains the maximum source width, but has no effect on source height. Thus if the source width is greater than 32 pixels, the operation can be sub-divided into strips of less than 32 pixels wide. Since this may affect blending, the boundaries of these divisions should only occur after the destination has been written out (i.e. a horizontal destination increment). With a maximum stretch/reduce ratio of 16:1, the boundary thus lands between 16 and 32 pixels in the X direction. The coefficients at the boundary conditions should be modified accordingly.

In a successful prototype of the invention 32 pixel line buffers and a 128 element X coefficient cache were used. Y coefficients are not cached and were read on-the-fly. Each embodiment is preferably pipelined, i.e. each block may proceed as soon as sufficient data is available. For instance, in the embodiment of FIG. 5, horizontal blender 41 becomes active when at least 2 pixel elements are available in line buffer 47. It does not have to wait until line buffer 47 is full before proceeding.

While a hardware implementation of the invention has been described above, it could be implemented alternatively by processing of the equivalent algorithm in a central processing unit (CPU). In order to reduce system CPU overhead, it is preferred that a dedicated CPU should be used which should be sufficiently fast, or if desired, a fast central CPU could be used if there is sufficient speed and capacity in the system. An algorithm for implementing the scaler function is listed in appendix A, using the C language, wherein coefficient data and source data are received and destination data is output, in a fashion similar to the hardware scaler. The coefficient generation code shown generates coefficients according to the scaling algorithm describer earlier.

Coefficient lists may be generated for limited line buffer implementations. The source data is sub-divided such that the end of each band has the X destination increment bit set and the X source increment bit set to ensure that the destination is written out and the source does not overlap with the next band. An extra dummy coefficient with the source increment bit set is added to the narrow coefficient list to ensure that the next source pixel is correctly latched into the line buffers. The sub-division code is listed in appendix B. This code subdivides the source area and the X coefficients into narrow strips in reference to the limited line buffer length in the final embodiment.

It should be noted that setting the coefficients for unity mapping (no expansion or contraction), and setting the destination size to be much larger than the source size will cause the scaler to perform a two-dimensional pattern fill where the pattern is constrained in the source area.

In addition, for a sixteen times over-sampled anti-aliased image, the source image should be reduced by a factor of 4 in each dimension using the algorithms described in this disclosure. This can be done at live video rates.

A person understanding this invention may now conceive of alternative structures and embodiments or variations of the above. All of those which fall within the scope of the claims appended hereto are considered to be part of the present invention.

APPENDIX A

```
COLORREF linebuffer1 [LINEBUFFERSIZE];
COLORREF linebuffer2 [LINEBUFFERSIZE];
void StrBitstrip(BlitArea src, BlitArea dst, int numXCoeff,
    int mYCoeff, COEFFICIENT xC[],
    COEFFICIENT yC[])
int i,j;
int yCoef1,yCoef2,ysrcInc,yDstInc,yAcc;
int xCoef1,xCoef2,xgrcInc,xDstInc,xAcc;
int srcIndex,lookAhead;
COLORREF yPixel1,yPixel2;
COLORREF xPixel1,xPixel2;
COLORREF outPixel;
int srcX,srcY,dstX,dstY;
int srcXBegin, srcXEnd, srcYBegin, srcYEnd;
int dstXBegin, dstXEnd, dstyBegin, dstyEnd;
srcX = srcXBegin = src.blitX;
srcY = srcYBegin = src.blitY;
srcXEnd = srcX + src.blitWidth;
srcYEnd = srcY + src.blitHeight;
dstX = dstXBegin = dst.blitX
dstY = dstYBegin = dst.blitY;
dstXEnd = dstX + dst.blitWidth;
dstYEnd = dstY + blitHeight;
// get 1st line
for [i=srcX,srcIndex=0; 1<srcX+src.blitWidth; i++,srcIndex++) {
linebuffer2[srcIndex] = GetPixel(memDC,1,srcY);
linebuffer2[srcIndex] = linebuffer2[srcIndex];
if (srcblitHeight <= dst.blitHeight)
linebuffer2[srcIndex] = GetPixel(memDC,1,srcY+1);
}
if (src.blitHeight <=dst.blitHeight) srcY++;
// begin blitting
for (j=0; j<numYCoeff; j++) {
// get y coefficients
yCoef1 = yC[j].p0Mul;
yCoef2 = yC[j].p1Mul;
YSrcInc = yC[j].sInc;
yDstInc = yC[j].dInc;
yAcc = yC[j].Accumulate;
// do y blends into linebuffer 1
for (i=0,srcIndex=0; i<numXCoeff; i++) {
// do y scaling
if (xC[i].sInc) {
yPixel1 = linebuffer1[srcIndex];
yPixel2 = linebuffer2[srcIndex];
if (yAcc) {
linebuffer1[srcIndex] = Weightpixel(yCoef1, yPixel1, yCoef2, yPixel2,
linebuffer1[srcIndex]);
} else {
linebuffer1[srcIndex] = Weightpixel(yCoef1, yPixel1,
yCoef2, yPixel2,0L);
}
srcIndex++;
}
}
// do first pixel X processing
srcIndex = 0;
i = 0;
xPixel1 = linebuffer1[0];
if (src.blitwidth > dst.blitwidth) }
xPixel2 = xPixel1,
lookAhead = 1;
} else {
xPixel2 = linebuffer1[1];
lookAhead = 2;
do {
if (xC[i].sInc) {
if (yDstInc && ySrcInc) linebuffer1[srcIndex] = linebuffer2[srcIndex];
srcIndex++;
}
i++;
}while (srcIndex < lookAhead);
// do x blends onto screen
for (i=0; i<numXCoeff; i++) {
// get x coefficients
xCoef1 = xC[i].p0Mul;
xCoef2 = xC[i].p1Mul;
xSrcInc = xC[i].sInc;
xDstInc = xC[i].dInc;
```

APPENDIX A-continued

```
xAcc = xC[i].Accumulate;
// do x scaling
if (yDstInc) {
if (xAcc) {
outPixel = WeightPixel(xCoef1,xPixel1,xCoef2,xPixel2,outPixel);
} else {
outPixel = WeightPixel(xCoef1,xPixel1,xCoef2,xPixel2,0L);
}
if (xDstInc) {
SetPixel (scrnDC.dstX,dstY,outPixel1;
if (xSrcInc) {
xPixel1 = xPixel2;
xPixel2 = linebuffer[srcIndex];
if (ySrcInc) linebuffer1(srcIndex) = linebuffer2[srcIndex];
}
}
if (xSrcInc) {
// advance the source pointer
srcX++;
if (srcX = srcXEnd) {
srcX = srcXBegin;
if (ySrcInc) {
srcY++;
if (srcy >= srcyEnd)
srcY = srcYBegin;
}
}
}
srcIndex++;
}
if (xDstInc) {
// advance the destination pointer
dstX++;
if (dstX >= dstXEnd) {
dstx = dstXBegin;
if (yDstInc) {
dstY++;
if (dstY >= dstYEnd)
dstY = dstYBegin;
}
}
}
}
}
// load next line
if (ySrcInc) {
for (i=0; i<numXCoeff; i++) {
linebuffer2[i] = GetPixel(memDC,srcX+i,srcY);
}
}
}
}
// Equation is (weight1*pixel1+weight2*pixel2)/16+pixel3
COLORREF WeightPixel(int weight1, COLORREF pixel1,
int weight2, COLORREF pixel2, COLORREF pixel3)
{
COLORREF rcolor;
unsigned int red,green,blue;
double fred, fgreen, fblue;
red = (UINT) (((ULONG(CetRValue(pixel1) * weight1 +
(ULONG)GetRValue(pixel2) * weight2));
red /= (1<<MBITS);
red += (UINT)GetRValue(pixel3);
green = (UINT((((ULONG(GetCValue(pixel1) * weight1 +
(ULONG)GetGValue(pixel2) * weight2));
green /= (1<<MBITS);
green += (UINT(GetGValue(pixel3);
blue = (UINT) (((ULONG)GetBValue(pixel1) * weight1 +
(ULONG)GetHValue(pixel2) * weight2));
blue /= (1<<MBITS)
blue += (UINT)GetBValue(pixel3);
if (red >255) red = 255;
if (green >255) green = 255;
if (blue >255) blue = 255;
rcolor = RCB(red,green,blue);
return rcolor;
Coefficient Generation
```

The C code below illustrates coefficient generation for an image of an arbitrary size to an arbitrary size:

```
#define MBITS 4 // number of bits for the multipliers
typedef struct tagCOEFFICIENT {
  unsigned int p0Mul:MBITS+1; // coefficient a
  unsigned int p1Mul:MBITS+1; // coefficient b
  unsigned int sInc:1; // source increment flag
  unsigned int dInc:1; // destination increment flag
  unsigned int Accumulate:1; // accumulate flag
} COEFFICIENT;
COEFFICIENT xCoefficient[LINEBUFFERSIZE];
COEFFICIENT yCoefficient[LINEBUFFERSIZE];
Void GetCoefficients(int srcWidth,int dstWidth,
          int srcHeight,int dstHeight)
{
int i,ycCnt;
int sCount,dCount,inPlaceCount;
int tsCount,tdCount,weight;
int lastIncr;
long m1,m2;
sCount = dstWidth;
tCount = srcWidth;
inPlaceCount = 0;
weight = 1;
for (i=0; i<=max(srcWidth,dstWidth); i++) {
  if (scaler.miscScaler.stretchX) {
    xCoefficient[i].Accummulate = 0;
    if (dCount<=sCount) {
      xCoefficient[i].sInc = 0;
      xCoefficient[i].dInc = 1;
      xCoefficient[i].p0Mul = 1<<MBITS;
      xCoefficient[i].p1Mul = 0;
      sCount -= dCount;
    } else {
      xCoefficient[i].sInc = 0:
      xcoefficient(i).dInc = 1;
      m1 = sCount;
      m2 = dCount - sCount;
      m1 = m1 * (1<<MBITS) / (m1 + m2);
      m2 = (1<<MBITS) - m1;
      xCoefficient[i].p0Mul = (int)m1;
      xCoefficient[i]p1Mul = (int)m2;
      sCount = dstWidth - (dCount - sCount);
    }
  } else {
    if (i>0 && xCoefficient[i-1].dInc==0) xCoefficient[i].Accumulate = 1;
    else xCoefficient[i].Accumulate = 0;
    if (sCount<dCount) {
      if (inPlaceCount==0) {
        weight = 1;
        tsCount = sCount;
        tdCount = dCount;
        while (tsCount<tdCount) {
          weight++;
          tdCount -= tsCount;
        }
      }
      xCoefficient[i].sInc = 1;
      xCoefficient[i].dInc = 0;
      xCoefficient[i].p0Mul = (1 << MBITS) / weight;
      if (inPlaceCount==0) {
        xCoefficient[i].p0Mul += (1 << MBITS) % weight;
        xCoefficient[i].p1Mul = 0:
        dCount -= sCount;
        inPlaceCount++;
      } else {
        xCoefficient[i].sInc = 1;
        xCoefficient[i].dInc = 1;
        m1 = dCount;
        m1 = sCount - dCount;
        m1 = m1 * (1<<MBITS) / ((m1 + m2) * weight;;
        m2 = (1<<MBITS) / weight - m1;
        xCoefficient[i].p0Mul = (int)m2;
        xCoefficient[i].p1Mul =(int)m1;
        dCount = srcWidth - (sCount - dCount);
        inPlaceCount = 0
        weight = 1;
      }
    }
  }
}
```

APPENDIX A-continued

```
scaler.numXCoeff = max(dstWidth,srcWidth);
ycCnt = 0;
sCount = dstHeight;
dCount = srcHeight;
inPlaceCount = 0;
weight = 1;
for (i=0; i<=max(srcHeight,dstHeight); 1++) {
if (scaler.miscScaler.stretchY) {
lastIncr = 1;
yCoefficient[i].Accumulate = 0;
if dCount < sCount) {
yCoefficient[i].sInc = 0;
yCoefficient[i].dInc = 1;
yCoefficient[i].p0Mul = 1<<MBITS;
YCoefficient[i].p1Mul = 0;
sCount -= dCount;
} else {
yCoefficient[i].sInc = 1;
yCoefficient[i].dInc = 1;
m1 = sCount;
m2 = dCount -sCount;
m1 = m1 * (1<<MBITS) / (m1 + m2);
m2 = (1<<MBITS) - m1;
yCoefficient[i].p0Mul = (int)m1;
yCoefficient[i].p1Mul = (int)m2;
sCount = dstHeight - (dCount - sCount);
} else {
if (ycCnt>0 && yCoefficient[ycCnt-1].dInc==0)
yCoefficient[ycCnt].Accumulate = 1;
else yCoefficient[ycCnt].Accumulate = 0;
if (sCount<dCount) {
lastIncr = 1;
if (inPlaceCount==0) {
weight = 1;
tsCount = sCount;
tdCount = dCount;
while (tsCount<tdCount) {
weight++;
tdCount -= tsCount;
    }
}
yCoefficient[ycCnt].sInc = 1;
yCoefficient[ycCnt].dInc = 0;
yCoefficient[ycCnt].p1Mul = (1 << MBITS) / weight;
if (inPlaceCount==0) {
yCoefficient[ycCnt].p1Mul += (1 << MBITS) % weight;
}
yCoefficient[ycCnt].p0Mul = 0;
if (i==1 && yCoefficient[0].dInc==0) {
yCoefficient[0].p0Mul = yCoefficient[0].p1Mul;
yCoefficient[0].p1Mul = yCoefficient[ycCnt].p1Mul;
ycCnt--;
}
dCount -= sCount;
inPlaceCount++;
} else {
lastIncr = 2;
m1 = dCount;
m2 = sCount - dCount;
m1 = m1 * (1<<MBITS) / ((m1 + m2) * weight);
m2 = (1<<MBITS) / weight - m1;
if (i==0) {
yCoefficient[ycCnt].sInc = 1;
yCoefficient[ycCnt].dInc = 1;
yCoefficient[ycCnt].p0Mul = (int)m2;
yCoefficient[ycCnt].p1Mul = (int)m1;
} else {
if (i==1 && yCoefficient[0].dInc==0) {
yCoefficient[0].p0Mul = yCoefficient[0].p1Mul;
yCoefficient[0].p1Mul = (int)m2
} else {
yCoefficient[ycCnt].sInc = 1;
yCoefficient[ycCnt].dInc = 0;
yCoefficient[ycCnt]p0Mul = 0;
yCoefficient[ycCnt].p1Mul = (int)m2;
if (m1!=0) ycCnt++;
}
if (m1!=0) {
yCoefficient[ycCnt].Accumulate = 1;
```

```
yCoefficient[ycCnt].sInc = 0;
yCoefficient[ycCnt].dInc = 1;
yCoefficient[ycCnt].p0Mul = 0;
yCoefficient[ycCnt].p1Mul = (int)m1;
} else {
yCoefficient[ycCnt].dInc = 1;
    }
}
dCount = srcHeight - (sCount - dCount);
inPlaceCount = 0;
weight = 1;
    }
}
ycCnt++;
}
scaler.numYCoeff = ycCnt;
```

APPENDIX B

```
void StretchBlit(int srcWidth, int dstWidth, int srcHeight,int dstHeight)
{
BlitArea source,dest;
int subSrcWidth,subDstWidth,srcXOffset,dstXOffset,coefOffset;
Int i, subCoefWidth;
COEFFICIENT localXC[LINEBUFFERSIZE];
GetCoefficients(srcWidth,dstWidth, srcHeight,dstHeight);
srcXOffset = dstXOffset = coefOffset = 0;
do {
if (((int)scaler.numXCoeff - coefOffset) < MAXBLITWIDTH) {
subcoefWidth = (int)scaler.numXCoeff - coefOffset;
} else {
// count coefficients until source increments==linebuffer length
for (i=0,subsrcWidth=0; subSrcWidth<MAXBLITWIDTH; i++) {
if (xCoefficient[coefOffset+i].sInc) subSrcWidth++;
subCoefWidth = i - 1;
// look backwards until you see both source and destination flushed
for (i=subCoefWidth; i>0; i--) {
if (scaler.src.Width >scaler.dst.Width) {
if (xCoefficient[coefOffset+i].dInc) break;
} else {
if (xCoefficient[coefOffset+i].sInc) break;
    }
}
subCoefWidth = i + 1;
}
// Count source and destination increments
for (i=0,.subSrcWidth=0,subDstWidth=0; i<subCoefWidth; i++) {
if(xCoefficient[coefOffset+i].sInc; subSrcWidth++;
if(xCoefficient[coefOffset+i].dInc; subDstWidth++;
}
// transfer coefficients
for (i=0; i<subCoefWidth; i++) {
localXC[i]= xCoefficient[coefOffset+i];
}
// always pad with an extra source increment to make sure the
// linebuffers latch that extra value
localXC[subCoefWidth].sInc = 1;
localXC[subCoefWidth].dIcn = 0;
localXC[subCoefWidth].p0Mul = 0;
localXC[subCoefWidth].p1Mul = 0;
localXC[subCoefWidth].Accumulate = 0;
// set up source and destination areas and blit
source.blitX = srcX + srcXOffset;
source.blitY = srcY;
source.blitwidth = subSrcWidth;
source.blitHeight = scaler.src.height;
dest.blitX = dstX + dstXOffset;
dest.blitY = dstY;
dest.blitWidth = subDstWidth;
dest.blitHeight = scaler.dst,height;
if (scaler.src.width!=scaler.det.width) {
source.blitWidth++;
StrBltStrip(source,dest,subCoefWidth+1,
scaler.numYCoeff,localXC,yCoefficient);
else {
StrBltStrip(source,dest,subCoefWidth,
```

APPENDIX B-continued

```
scaler.numYCoeff,localXC,yCoefficient);
}
// get ready for next strip
coefOffset += subCoefWidth;
srcXOffset += subSrcWidth;
dstXOffset += subDstWidth;
} while (coefOffset < (int)scaler.numXCoeff);
}
```

We claim:

1. An image scaler comprising:
   (a) means for receiving a data signal representing scaling coefficients a and b and image display values of adjacent pixels P and Q respectively of an image,
   (b) circuit means for repeatedly operating on said received coefficients and values for successive pixels according to the transform $$A_{cc} = \frac{aP + bQ}{SUM} + R$$

where
   SUM is the sum of the values of the coefficients,
   R is either zero or the accumulated result of an immediately preceding operation,
   $A_{cc}$ is an accumulated result signal, and
   (c) means for providing a first result signal as an output coefficient word to apparatus for controlling the display of each of adjacent pixels.

2. An image scaler as defined in claim 1 in which the successive pixels are adjacent pixels of a horizontal line.

3. An image scaler as defined in claim 1 in which the successive pixels are adjacent pixels of adjacent lines.

4. An image scaler as defined in claim 1 in which the sum of said coefficients fixed.

5. An image scaler as defined in claim 4 in which the sum of said coefficients is 16.

6. An image scaler comprising:
   (a) means for receiving a data signal representing scaling coefficients a and b and image display values or adjacent pixels P and O respectively of an image,
   (b) circuit means for repeatedly operating on said received coefficients and values for successive pixels according to the transform $$A_{cc} = \frac{aP + bQ}{SUM} + R$$

where
   SUM is the sum of the values of the coefficients.
   R is either zero or the accumulated result of an immediately preceding operation,
   $A_{cc}$ is an accumulated result signal,
   (c) means for providing a first result signal as an output coefficient word to apparatus for controlling the display of each of adjacent pixels
   (d) the successive pixels being adjacent pixels of adjacent lines, and
   (e) in which the coefficients a and b define adjacent vertical pixel coefficients $a_v$ and $b_v$ respectively, relating to vertically adjacent pixels values $P_v$ and $Q_v$ respectively, and further including means for receiving adjacent horizontal pixel coefficients $a_H$ and $b_H$ relating to the values of $P_H$ and $Q_H$ respectively of adjacent horizontal pixels respectively, means for receiving results of an operation on adjacent pixels of adjacent lines, and for performing operation on said coefficients $a_H$ and $b_H$ for the pixel values $P_H$ and $Q_H$ of successively adjacent pixels in horizontal lines resulting from a previous operation on said coefficients $a_v$ and $b_v$ for the pixel values $P_v$ and $Q_v$ respectively, and accumulating the result according to the transform $$A_{cc} + \frac{a_H P_H + b_H P_H}{SUM} + R$$

and providing a result as said first result signal for said controlling the display of adjacent pixels.

7. An image scaler comprising;
   (a) means for receiving a data signal representing scaling coefficients a and b and image display values of adjacent pixels P and O respectively of an image,
   (b) circuit means for repeatedly operating on said received coefficients and values for successive pixels according to the transform $$A_{cc} = \frac{aP + bQ}{SUM} + R$$

where
   SUM is the sum of the values of the coefficients.
   R is either zero or the accumulated result of an immediately preceding operation
   $A_{cc}$ is an accumulated result signal,
   (c) means for providing a first result signal as an output coefficient word to apparatus for controlling the display of each of adjacent pixels,
   (d) the successive pixels being adjacent pixels of a horizontal lines, and
   (e) in which the coefficients a and b define adjacent vertical pixel coefficients $a_H$ and $b_H$ respectively, relating to vertically adjacent pixel values $P_H$ and $Q_H$ respectively, and further including means for receiving adjacent horizontal pixel coefficients $a_v$ and $b_v$ relating to the values of $P_v$ and $Q_v$ respectively of adjacent vertical pixels respectively, means for receiving results an operation on horizontally adjacent pixels, and for performing operations on said coefficients $a_v$ and $b_v$ for the pixel values $P_v$ and $Q_v$ of successively adjacent pixels lines resulting from a previous operation on said coefficients $a_H$ and $b_H$ for the pixel values $P_H$ and $Q_H$, respectively, and accumulating the result, according to the transform $$A_{cc} = \frac{a_v P_v + b_v P_v}{SUM} + R$$

and providing a result as said first result signal for said controlling the display of adjacent pixels.

8. An image scaler comprising:
   (a) a vertical blend ALU for performing the transform $$\frac{a_v P + b_v Q}{SUM_v} + R$$

(b) a horizontal blend ALU for performing the transform $$\frac{a_H P + b_H Q}{SUM_H} + R$$

where $a_v$, $b_v$, $a_H$ and $b_H$ are vertical and horizontal blending coefficients, P and Q are respectively parameters relating to adjacent pixels, $SUM_v$ and $SUM_H$ are respectively sums of the vertical and horizontal coefficients, and R is either zero or the accumulated result of a previous operation, (c) means for providing P and Q data of pairs of adjacent image lines to the vertical blend ALU, (d) means for receiving and buffering the output of the vertical blend ALU for providing R data to the vertical blend ALU, and for providing P and Q data to the horizontal blend ALU, (e) a pixel accumulator connected to the output of the horizontal blend ALU for providing R data to the horizontal blend ALU and for providing an output signal comprising pixel data resulting from expansion, contraction or unity transformation of the P and Q data.

9. An image scaler as defined in claim 8 in which the means for providing P and Q data related to pairs of adjacent lines is comprised of a first line buffer for receiving P and Q data from an input source and for outputting the Q data to a Q input of the vertical blend ALU, and a second line buffer for receiving the P and Q data and for outputting the P data to a P input of the vertical blend ALU, whereby the first and second line buffers provide later and earlier adjacent line pixel data respectively to the vertical blend ALU.

10. An image scaler as defined in claim 9 in which the means for receiving and buffering the output of the vertical blend ALU is comprised of a third line buffer.

11. An image scaler as defined in claim 9 in which the means for receiving and buffering the output of the vertical blend ALU is comprised of a pixel latch the output of which is applied to a P input of the horizontal blend ALU, the output of the vertical blend ALU being applied to a Q input of the horizontal blend ALU, and further comprising a multiplexer having a pair of inputs, one input being connected to receive the output of the first line buffer and another input being connected to receive the R data from the means for receiving and buffering the output of the vertical blend ALU, the multiplexer having an output connected to the input of the second line buffer.

12. An image scaler as defined in claim 8 in which both $SUM_v$ and $SUM_H$ are 16.

13. An image scaler comprising:

(a) a vertical blend ALU for performing the transform $$\frac{a_v P + b_v Q}{SUM_v} + R$$

(b) a horizontal blend ALU for performing the transform $$\frac{a_H P + b_H Q}{SUM_H} + R$$

where $a_v$, $b_v$, $a_H$ and $b_H$ are vertical and horizontal blending coefficients, P and Q are respectively parameters relating to adjacent pixels, $SUM_v$ and $SUM_H$ are respectively sums of the vertical and horizontal coefficients, and R is either zero or the accumulated result of a previous operation, (c) means for providing P and Q data of pairs of adjacent pixels of a line to the horizontal blend ALU, (d) a pixel accumulator connected to the output of the horizontal blend ALU, for providing R data to the horizontal blend ALU, (e) a multiplexer for receiving an output of signal of the pixel accumulator, having a pair of outputs, and having a control input for controlling on which of said outputs data is applied, (f) a pair of line buffers, each having an input connected to an output of the multiplexer, the output of each of the line buffers respectively connected to corresponding Q and P inputs of the vertical blend ALU, and (g) means for receiving and buffering the output of the vertical blend ALU, for providing R data to the vertical blend ALU, and for providing an output signal comprising pixel data resulting from expansion, contraction or unity transformation of P and Q.

14. An image scaler as defined in claim 13 in which the means for providing P and Q data of pairs of adjacent pixels is comprised of an input source connected to a P input of the horizontal blend ALU and through a pixel delay buffer to a Q input of the horizontal blend ALU.

15. A method of scaling images comprising:

(a) receiving data representing scaling coefficients a and b and image display values of adjacent pixels P and Q respectively of an image, (b) repeatedly operating on said coefficients and values for successive pixels according to the transform $$A_{cc} = \frac{aP + bQ}{SUM} + R$$

where
SUM is the sum of the values of the coefficients,
R is either zero or the accumulated SUM of an immediately preceding operation,
$A_{cc}$ is an accumulated result signal, (c) providing a first result signal as an output coefficient word to apparatus for controlling the display of each of adjacent pixels.

16. A method of scaling images as defined in claim 15 in which the successive pixels are adjacent pixels of a horizontal line.

17. A method of scaling images comprising:

(a) receiving data representing scaling coefficients a and b and image display values of adjacent pixels P and 0 respectively of an image, (b) repeatedly operating on said coefficients and values for successive pixels according to the transform $$A_{cc} = \frac{aP + bQ}{SUM} + R$$

where
SUM is the sum of the values of the coefficients,
R is either zero or the accumulated result of an immediately preceding operation,
$A_{cc}$ is an accumulated result signal, (c) providing a first result signal as an output coefficient word to apparatus for controlling the display of each of adjacent pixels, (d) the successive pixels being adjacent pixels of a horizontal line, and (e) in which the coefficients a and b define adjacent horizontal pixel coefficients $a_H$ and $b_H$ respectively relating to horizontally adjacent pixel values $P_H$ and $Q_H$ respectively, and further including receiving adjacent vertical pixel coefficients $a_v$ and $b_v$ relating to values $P_v$ and $Q_v$ respectively of adjacent vertical pixels respectively, receiving results of an operation on horizontally adjacent pixels, and performing operations on said coefficients $a_v$ and $b_v$ for the pixel values $P_v$ and $Q_v$ of adjacent pixels of successively adjacent lines resulting from a previous operation on said coefficients $a_H$ and $b_H$ for the pixel values $P_H$ and $Q_H$, respectively, accumulating the result, according to the transform $$A_{cc} = \frac{a_v P_v + b_v P_v}{SUM} + R$$

and providing a result as said first result signal for said controlling the display of adjacent pixels.

18. A method of scaling images as defined in claim 17 in which the sum of said coefficients is fixed.

19. A method of scaling images comprising:

(a) performing in a vertical blend ALU the transform $$\frac{a_v P + b_v P}{SUM_v} + R$$

(b) performing in a horizontal blend ALU the transform $$\frac{a_H P + b_H Q}{SUM_H} + R$$

where $a_v$, $b_v$, $a_H$ and $b_H$ are signals representing vertical and horizontal blending coefficients, P and Q are signals respectively representing parameters relating to adjacent pixels in adjacent lines or in a single line, $SUM_v$ and $SUM_H$ are signals respectively representing sums of the vertical and horizontal coefficients, and R is a signal representing either zero or the accumulated result of a previous operation, and (c) providing an output signal comprising pixel data resulting from expansion, contraction or unity transformation of P and Q in accordance with the aforenoted transforms, to apparatus for controlling the display of said resulting pixel data.

* * * * *